US012169016B1

(12) United States Patent
Ruder et al.

(10) Patent No.: US 12,169,016 B1
(45) Date of Patent: Dec. 17, 2024

(54) AUTOMOTIVE DRIVETRAIN GEARBOX INCLUDING DIFFERENTIAL COVER NESTED WITH ROTOR

(71) Applicant: Schaeffler Technologies AG & Co. KG, Herzogenaurach (DE)

(72) Inventors: Viktor Ruder, Furth (DE); Andreas Rosenwald, Nuremberg (DE); Gunter Volkel, Puschendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/517,620

(22) Filed: Nov. 22, 2023

(51) Int. Cl.
*F16H 48/38* (2012.01)
*F16H 48/08* (2006.01)
*F16H 48/40* (2012.01)
*F16H 57/037* (2012.01)
*F16H 57/04* (2010.01)

(52) U.S. Cl.
CPC ............. *F16H 48/08* (2013.01); *F16H 48/40* (2013.01); *F16H 57/037* (2013.01); *F16H 57/0483* (2013.01); *F16H 57/043* (2013.01)

(58) Field of Classification Search
CPC ....... B60K 2007/0092; F16H 2048/364; F16H 48/08; F16H 48/40; F16H 57/037; F16H 57/0483; F16H 57/043
See application file for complete search history.

(56) References Cited

U.S. PATENT DOCUMENTS 5,176,589 A * 1/1993 Borgudd ................. F16H 48/08
475/221
2022/0316580 A1 * 10/2022 Asai ..................... F16H 57/0423

FOREIGN PATENT DOCUMENTS

| CN | 101602326 A | * | 12/2009 | ............. B60K 17/16 |
| CN | 109109640 A | * | 1/2019 | ............. B60B 35/14 |
| CN | 112918189 A | * | 6/2021 | ............. B60K 17/16 |
| CN | 115214327 A | * | 10/2022 | ............. B60K 1/00 |
| DE | 4410074 A1 | * | 9/1995 | ............. B60K 1/00 |

* cited by examiner

*Primary Examiner* — Tisha D Lewis
(74) *Attorney, Agent, or Firm* — Davidson Kappel LLC

(57) ABSTRACT

A drive assembly for a motor vehicle drivetrain includes a differential configured for driving a first output shaft and a second output shaft about a center axis and for allowing the first output shaft and the second output shaft to rotate about the center axis at different speeds. The differential includes a first side gear on a first side of the differential configured for being drivingly connected to the first output shaft; a second side gear on a second side of the differential configured for being drivingly connected to the second output shaft; a differential housing enclosing the first and second side gears; support pins non-rotatably fixed to the differential housing; and spider gears rotatably mounted on the support pins and positioned between the first side gear and the second side gear. Each of the spider gears intermeshes with both the first side gear and the second side gear to transmit power from the support pins to the first side gear and the second side gear. The drive assembly further includes a hollow drive shaft for driving the differential. The differential housing is configured for transmitting power from hollow drive shaft to the support pins. The hollow drive shaft is partially nested radially within the differential housing to direct oil from inside of the hollow drive shaft into the differential housing.

18 Claims, 3 Drawing Sheets

AUTOMOTIVE DRIVETRAIN GEARBOX INCLUDING DIFFERENTIAL COVER NESTED WITH ROTOR

TECHNICAL FIELD

The present disclosure relates generally to motor vehicle drivetrains, and more specifically to differentials in gearboxes for motor vehicle drivetrains.

BACKGROUND

When a differential is supplied with oil via oil sump lubrication and no pump is present to provide oil to the differential of a gearbox, oil supply is difficult, especially at low speeds and high torques.

SUMMARY

A drive assembly for a motor vehicle drivetrain includes a differential configured for driving a first output shaft and a second output shaft about a center axis and for allowing the first output shaft and the second output shaft to rotate about the center axis at different speeds. The differential includes a first side gear on a first side of the differential configured for being drivingly connected to the first output shaft; a second side gear on a second side of the differential configured for being drivingly connected to the second output shaft; a differential housing enclosing the first and second side gears; support pins non-rotatably fixed to the differential housing; and spider gears rotatably mounted on the support pins and positioned between the first side gear and the second side gear. Each of the spider gears intermeshes with both the first side gear and the second side gear to transmit power from the support pins to the first side gear and the second side gear. The drive assembly further includes a hollow drive shaft for driving the differential. The differential housing is configured for transmitting power from hollow drive shaft to the support pins. The hollow drive shaft is partially nested radially within the differential housing to direct oil from inside of the hollow drive shaft into the differential housing.

In examples, a radially extending end surface of the hollow drive shaft that axially faces toward the first side gear is axially closer to the first side gear than a radially extending end surface of the differential housing that axially faces away from the first side gear.

In examples, the first side gear includes a tubular hub including a radially extending end surface that axially faces away from the first side gear and directly axially toward the radially extending end surface of the hollow drive shaft, an axial gap is defined between the radially extending end surface of the tubular hub and the radially extending end surface of the hollow drive shaft, an inner circumferential surface of a guide portion of the differential housing being directly radially aligned with the axial gap.

In examples, the inner circumferential surface of the guide portion of the differential housing is radially spaced from an outer circumferential surface of the tubular hub of the first side gear to define an annular gap therebetween.

In examples, the hollow drive shaft, the guide portion of the differential housing and the tubular hub of the first side gear are arranged to direct fluid flowing axially within the hollow drive shaft toward the first side gear radially outward through the axial gap, and axially through the annular gap into the spider gears.

In examples, the differential housing includes a differential carrier carrying the support pins and a differential cover connected to the differential carrier. The differential cover includes the guide portion and the radially extending end surface of the differential housing.

In examples, the differential carrier includes an annular rim extending away from the first side. The differential cover is received in an inner circumferential surface of the annular rim.

In examples, the first side gear includes a gear portion extending radially outward from the tubular hub. A radially extending surface of the gear portion is axially spaced from a radially extending surface of the differential cover to define a radial gap therebetween. The first side gear and the differential cover are arranged to direct fluid flowing in the annular gap through the radial gap into the spider gears.

In examples, a resilient spacer is provided between the radially extending surface of the gear portion and the radially extending surface of the differential cover to define the radial gap. The resilient spacer is configured for forcing the first side gear into the spider gears.

In examples, the first output shaft is received inside of the hollow drive shaft to define a tubular gap configured to direct fluid flow into the axial gap.

In examples, the second side gear includes a tubular hub having an inner circumferential surface configured for non-rotatably connecting to the second output shaft.

In examples, the differential housing includes a tubular hub section rotatably receiving the tubular hub of the second side gear.

In examples, the drive assembly further includes a sun gear non-rotatably fixed to an outer diameter of the hollow drive shaft, a plurality of planet gears driven by the sun gear and a plurality planet carriers configured to drive the differential housing.

A motor vehicle drive unit is also provided including the drive assembly and a gearbox housing defining a sump for receiving oil for lubricating the differential. The differential is inside of the gearbox housing, and the hollow drive shaft extend is into the gearbox housing.

A method of constructing a drive assembly for a motor vehicle drivetrain is also provided. The method includes inserting a first side gear, a second side gear, support pins and spider gears inside a differential carrier; connecting a differential cover to the differential carrier, the differential cover forcing the first side gear into the spider gears; partially nesting a hollow drive shaft radially within the differential cover to direct oil from inside of the hollow drive shaft into the spider gears; and drivingly connecting a first output shaft to the first side gear and drivingly connecting a second output shaft to the second side gear. The spider gears are rotatably mounted on the support pins and positioned between the first side gear and the second side gear. Each of the spider gears intermeshes with both the first side gear and the second side gear to transmit power from the support pins to the first side gear and the second side gear for allowing the first output shaft and the second output shaft to rotate about a center axis at different speeds.

In examples, method further includes installing a resilient spacer axially between the first side gear and the differential cover to force the first side gear into the spider gears and to define a radial gap axially between the first side gear and the differential cover. The first side gear and the differential cover are arranged to direct fluid flowing from inside of the hollow drive shaft into the spider gears.

In examples, the partially nesting is performed to provide a radially extending end surface of the hollow drive shaft axially facing toward the first side gear such that the radially extending end surface of the hollow drive shaft is axially closer to the first side gear than a radially extending end surface of the differential cover that axially faces away from the first side gear.

In examples, the first side gear includes a tubular hub includes a radially extending end surface that axially faces away from the first side gear and directly axially toward the radially extending end surface of the hollow drive shaft, and the partially nesting is performed to provide an axial gap between the radially extending end surface of the tubular hub and the radially extending end surface of the hollow drive shaft. An inner circumferential surface of a guide portion of the differential cover is directly radially aligned with the axial gap.

In examples, the connecting of the differential cover to the differential carrier includes radially spacing the inner circumferential surface of the guide portion of the differential cover from an outer circumferential surface of the tubular hub of the first side gear to define an annular gap therebetween.

In examples, the hollow drive shaft, the guide portion of the differential cover and the tubular hub of the first side gear are arranged to direct fluid flowing axially within the hollow drive shaft toward the first side gear radially outward through the axial gap, and axially through the annular gap into the spider gears.

BRIEF DESCRIPTION OF THE DRAWINGS

The present disclosure is described below by reference to the following drawings, in which.

DETAILED DESCRIPTION

Figure 1:
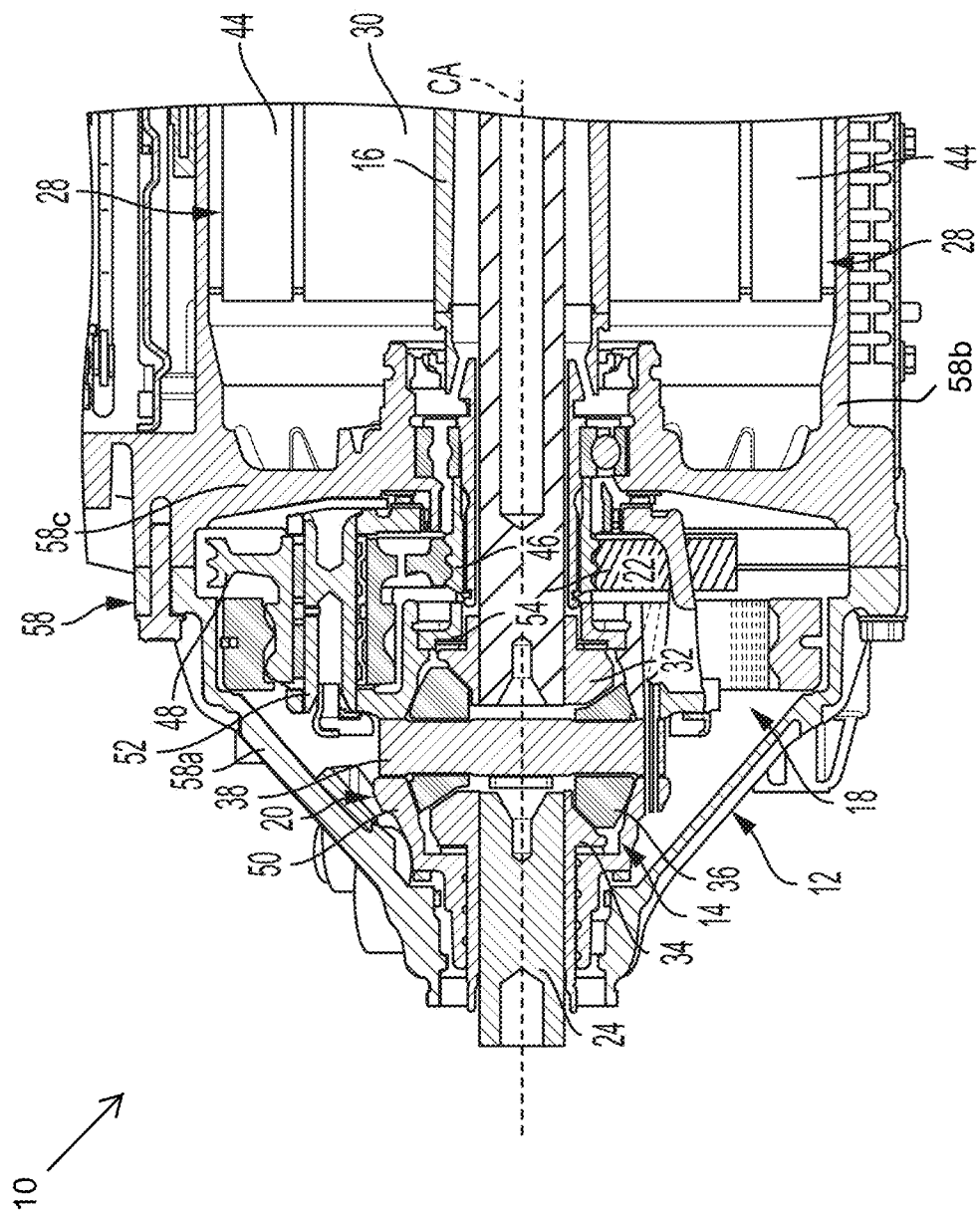
FIG. 1 shows a radial cross-sectional view of a drive unit of a motor vehicle drivetrain including a drive assembly according to the present disclosure.
Figure 2:
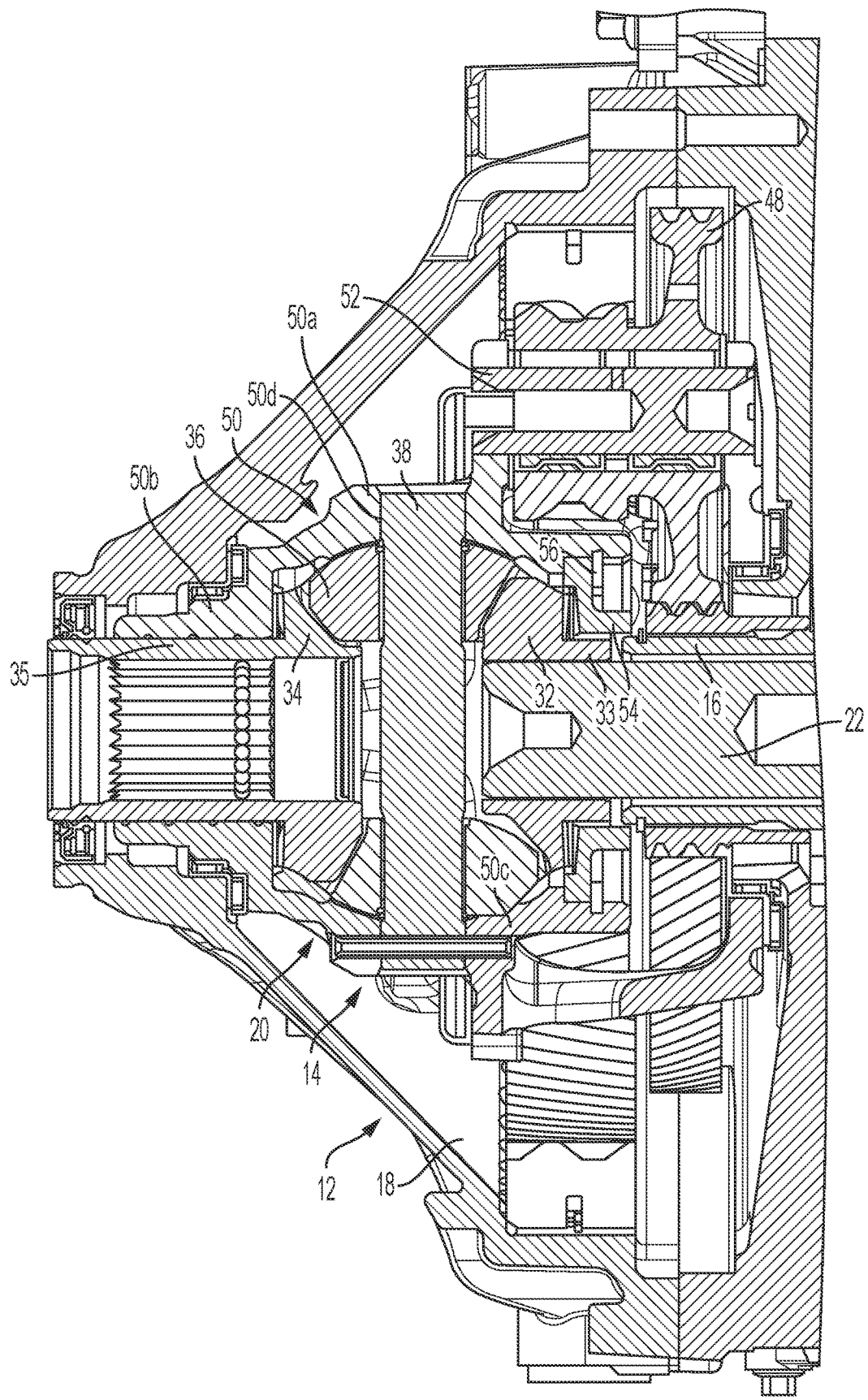
FIG. 2 shows an enlarged radial cross-sectional view of a gearbox of the drive assembly.
Figure 3:
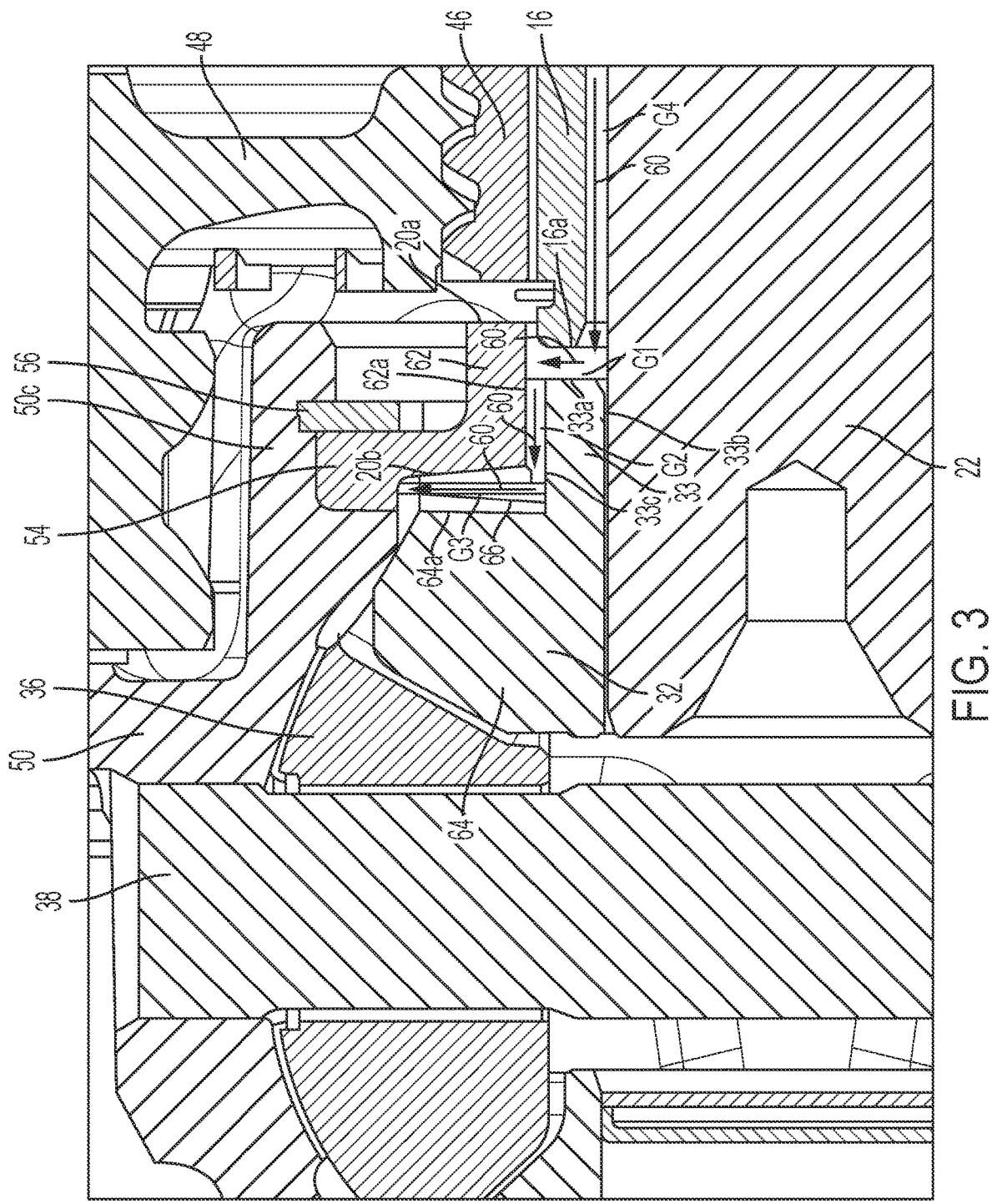
FIG. 3 shows a further enlarged radial cross-sectional view of the gearbox, illustrating a hollow drive shaft partially nested inside a differential housing of the differential.

FIG. 1 shows a radial cross-sectional view of a drive unit 10 of a motor vehicle drivetrain including a drive assembly, which includes a gearbox 12 including differential 14, a hollow drive shaft 16 extending into the gearbox 12, and an oil sump 18; FIG. 2 shows an enlarged radial cross-sectional view of the gearbox 12; and FIG. 3 shows a further enlarged radial cross-sectional view of the gearbox 12, illustrating rotor shaft 16 partially nested inside a differential housing 20 of differential 14. The hollow drive shaft 16 configured for inputting torque into the differential 14. In order to improve the supply of oil, in the presence of an oil sump 18 within gearbox 12, to the differential 14, rotor shaft 16 is partially nested inside a differential housing 20 of differential 14.

Gearbox 12 further includes a first output shaft 22 and a second output shaft 24 is configured for driving a first axle and a second axle of the motor vehicle drivetrain about a center axis CA and for allowing the first output shaft 22 and the second axle to rotate about the center axis CA at different speeds.

In the example shown in FIGS. 1, the differential 14 receives a power input from an electric motor 28 via drive shaft 16, which is a rotor shaft non-rotatably connected a rotor 30 of electric motor 28. In other example, the input shaft can be driven by an internal combustion engine alone, or in combination with an electric motor when the vehicle is a hybrid. The differential 14 further includes a first side gear 32 on a first side of the differential 14 configured for being drivingly connected to the first output shaft 22 to transmit power from input shaft 16 to the first output shaft 22 for driving a first wheel of the motor vehicle drivetrain.

The differential 14 also includes a second side gear 34 on a second side of the differential 14 configured for being drivingly connected to the second output shaft 24 to transmit power to the first output shaft 22 for driving a second wheel of the motor vehicle drivetrain. Spider gears 36 are rotatably mounted on support pins 38, which are positioned between the first side gear 32 and the second side gear 34. Each of the spider gears 36 intermeshes with both the first side gear 32 and the second side gear 34 to transmit power from the support pins 38 to the first side gear 32 and the second side gear 34. First side gear 32 includes a tubular hub 33 having an inner circumferential surface that includes teeth or splines for non-rotatably fixing first side gear 32 with respect to first output shaft 22. Second side gear 34 includes a tubular hub 35 having an inner circumferential surface that includes teeth or splines for non-rotatably fixing second side gear 34 with respect to second output shaft 24.

In the example of FIGS. 1 to 3, as noted above, drive shaft 16 is the rotor shaft of an electric motor 28, with drive shaft 16 being non-rotatably fixed to rotor 30 of electric motor 28 and being rotated about center axis CA with rotor 30 by a stator 44 of electric motor 28 in a known manner. Drive shaft 16 is provided with a sun gear 46 non-rotatably fixed to the outer diameter thereof. Sun gear 46 drives a plurality of planet gears 48, which in turn drive a differential carrier 50 of differential 14 via planet carriers 52. Carrier 50 is configured for transmitting power from the planet gears 48 to the support pins 38. In particular, carrier 50 includes radially extending slots 50$d$ formed therein, and each of the support pins 38 extends into a respective one of the slots 50$d$. Carrier 50 includes a rounded section 50$a$, which curves away from center axis CA, surrounding spider gears 36, and a tubular hub section 50$b$ surrounding tubular hub 35 such that second side gear 34 is rotatable with respect to carrier 50. On an opposite of carrier 50 as tubular hub section 50$b$, carrier 50 includes an annular rim 50$c$.

Differential housing 20 further includes a differential cover 54 axially fixed to carrier 50 to hold first side gear 32 axially in place inside of carrier 50. More specifically, cover 54 is received within annular rim 50$c$ of carrier 50 and is held axially in place by a snap ring 56 provided in a groove on an inner circumferential surface of annular rim 50$c$.

Referring to FIG. 1, drive unit 10 includes a housing 58 that is formed by a first end housing section 58$a$ axially and radially surrounding differential 14 and gears 46, 48, and an intermediate housing section 58$b$ radially surrounding electric motor 28. Intermediate housing section 58$b$ includes a radially extending annular wall 58$c$ defining, together with first end housing section 58$a$, a housing of gearbox 12. The housing of gearbox 12 defines oil sump 18, which is a lubrication chamber provided within gearbox 12 that is provided with oil for lubricating differential 14 during operation via an oil flow 60.

FIG. 3 shows a further enlarged section of the gearbox 12, illustrating drive shaft 16 being partially nested inside differential housing 20 of differential 14 to improve oil flow to differential 14. During operation of drive unit 10, as shown by arrows illustrating the oil flow 60 in FIG. 2, the oil flows between an outer circumferential surface of first output shaft 22 and an inner circumferential surface of drive shaft 16 toward differential 14. This oil flow 60 is directed by differential housing 20 into an interior of differential 14 to lubricate the interior parts of differential 14. In other words, cover 54 directs fluid inside of carrier 50 to lubricate side gears 32, 34 and spider gears 36.

A radially extending end surface 16a of the hollow drive shaft 16 that axially faces toward the first side gear 32 is axially closer to the first side gear 32 than a radially extending end surface 20a of the differential housing 20 that axially faces away from the first side gear 32. Differential housing 20 is specifically part of cover 54.

The tubular hub 33 of first side gear 32 includes a radially extending end surface 33a that axially faces away from the first side gear 32 and directly axially toward the radially extending end surface 16a of the hollow drive shaft 16. An axial gap G1 is defined between the radially extending end surface 33a of the tubular hub 33 and the radially extending end surface 16a of the hollow drive shaft 16. An inner circumferential surface 62a of a guide portion 62 of the differential housing 20 is directly radially aligned with the axial gap G1.

The inner circumferential surface 33b of the guide portion 62 is radially spaced from an outer circumferential surface 33c of the tubular hub 33 to define an annular gap G2 therebetween.

The first side gear 32 includes a gear portion 64 extending radially outward from the tubular hub 33. Gear portion 64 includes a radially extending surface 64a that is axially spaced from a radially extending surface 20b of the differential housing 20, which is specially part of cover 54, to define a radial gap G3 therebetween. The first side gear 32 and the differential cover 54 are arranged to direct fluid flowing in the annular gap G2 through the radial gap G3 into the spider gears 36. A resilient spacer 66 is provided between the radially extending surface 64a of the gear portion 64 and the radially extending surface 20b of the differential housing 20 to define the radial gap G3. The resilient spacer 66 is positioned on the outer circumferential surface 33c and is configured for forcing the first side gear 32 into the spider gears 36, and is provided with slots and or holes to allow fluid to flow therethrough.

The first output shaft 22 is received inside of the hollow drive shaft 16 to define a tubular gap G4 configured to direct fluid flow into the axial gap G1. Accordingly, the hollow drive shaft 16, the guide portion 62 of the differential housing 20 and the tubular hub 33 of the first side gear 32 are arranged to direct fluid flowing axially within tubular gap G4 toward the first side gear 32 radially outward through the axial gap G1, axially through the annular gap G2 into the spider gears 36 then radially through the radial gap G3 into the spider gears 36.

A method of constructing the drive assembly includes inserting first side gear 32, second side gear 34, support pins 38 and spider gears 36 inside the differential carrier 50, then connecting differential cover 54 to the differential carrier 50 such that the differential cover 54 forces the first side gear 32 into the spider gears 36. The method further includes partially nesting hollow drive shaft 16 radially within the differential cover 54 to direct oil from inside of the hollow drive shaft 16 into the spider gears 36.

Then method further includes drivingly connecting first output shaft 22 to the first side gear and drivingly connecting the second output shaft 24 to the second side gear 34 such that the spider gears 36 are rotatably mounted on the support pins 38 and positioned between the first side gear 32 and the second side gear 34. Each of the spider gears 36 thus intermeshes with both the first side gear 32 and the second side gear 34 to transmit power from the support pins 38 to the first side gear 32 and the second side gear 34 for allowing the first output shaft 22 and the second output shaft 24 to rotate about center axis CA at different speeds.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

REFERENCE NUMERALS 10 drive unit
12 gearbox
14 differential
16 hollow drive shaft
16a radially extending end surface
18 oil sump
20 differential housing
20a radially extending end surface
20b radially extending surface
22 first output shaft
24 second output shaft
28 electric motor
30 rotor
32 first side gear
33 tubular hub
33a radially extending end surface
33b inner circumferential surface
33c outer circumferential surface
34 second side gear
35 tubular hub
36 spider gears
38 support pins
44 stator
46 sun gear
48 plurality of planet gears
50 carrier
50a rounded section
50b tubular hub section
50c annular rim
50d slots
52 planet carriers
54 differential cover
56 snap ring
58 housing
58a first end housing section
58b intermediate housing section
58c radially extending annular wall
60 oil flow
62 guide portion
62a inner circumferential surface
64 gear portion
64a radially extending surface
66 resilient spacer

What is claimed is:
1. A drive assembly for a motor vehicle drivetrain comprising:
a differential configured for driving a first output shaft and a second output shaft about a center axis and for allowing the first output shaft and the second output shaft to rotate about the center axis at different speeds, the differential comprising:

a first side gear on a first side of the differential configured for being drivingly connected to the first output shaft;

a second side gear on a second side of the differential configured for being drivingly connected to the second output shaft;

a differential housing enclosing the first and second side gears;

support pins non-rotatably fixed to the differential housing; and spider gears rotatably mounted on the support pins and positioned between the first side gear and the second side gear, each of the spider gears intermeshing with both the first side gear and the second side gear to transmit power from the support pins to the first side gear and the second side gear; and a hollow drive shaft for driving the differential, the differential housing configured for transmitting power from hollow drive shaft to the support pins, the hollow drive shaft being partially nested radially within the differential housing to direct oil from inside of the hollow drive shaft into the differential housing, wherein a radially extending end surface of the hollow drive shaft that axially faces toward the first side gear is axially closer to the first side gear than a radially extending end surface of the differential housing that axially faces away from the first side gear, wherein the first side gear includes a tubular hub including a radially extending end surface that axially faces away from the first side gear and directly axially toward the radially extending end surface of the hollow drive shaft, an axial gap being defined between the radially extending end surface of the tubular hub and the radially extending end surface of the hollow drive shaft, an inner circumferential surface of a guide portion of the differential housing being directly radially aligned with the axial gap.

2. The drive assembly as recited in claim 1 wherein the inner circumferential surface of the guide portion of the differential housing is radially spaced from an outer circumferential surface of the tubular hub of the first side gear to define an annular gap therebetween.

3. The drive assembly as recited in claim 2 wherein the hollow drive shaft, the guide portion of the differential housing and the tubular hub of the first side gear are arranged to direct fluid flowing axially within the hollow drive shaft toward the first side gear radially outward through the axial gap, and axially through the annular gap into the spider gears.

4. The drive assembly as recited in claim 3 wherein the differential housing includes a differential carrier carrying the support pins and a differential cover connected to the differential carrier, the differential cover including the guide portion and the radially extending end surface of the differential housing.

5. The drive assembly as recited in claim 4 wherein the differential carrier includes an annular rim extending away from the first side, the differential cover being received in an inner circumferential surface of the annular rim.

6. The drive assembly as recited in claim 4 wherein the first side gear includes a gear portion extending radially outward from the tubular hub, a radially extending surface of the gear portion being axially spaced from a radially extending surface of the differential cover to define a radial gap therebetween, the first side gear and the differential cover being arranged to direct fluid flowing in the annular gap through the radial gap into the spider gears.

7. The drive assembly as recited in claim 6 wherein a resilient spacer is provided between the radially extending surface of the gear portion and the radially extending surface of the differential cover to define the radial gap, the resilient spacer configured for forcing the first side gear into the spider gears.

8. The drive assembly as recited in claim 3 wherein the first output shaft is received inside of the hollow drive shaft to define a tubular gap configured to direct fluid flow into the axial gap.

9. The drive assembly as recited in claim 3 wherein the second side gear includes a tubular hub having an inner circumferential surface configured for non-rotatably connecting to the second output shaft.

10. The drive assembly as recited in claim 9 wherein the differential housing includes a tubular hub section rotatably receiving the tubular hub of the second side gear.

11. The drive assembly as recited in claim 1 further comprising a sun gear non-rotatably fixed to an outer diameter of the hollow drive shaft, a plurality of planet gears driven by the sun gear and a plurality planet carriers configured to drive the differential housing.

12. A motor vehicle drive unit comprising:
the drive assembly as recited in claim 1; and
a gearbox housing defining a sump for receiving oil for lubricating the differential, the differential being inside of the gearbox housing, the hollow drive shaft extending into the gearbox housing.

13. A method of constructing a drive assembly for a motor vehicle drivetrain, the method comprising:
inserting a first side gear, a second side gear, support pins and spider gears inside a differential carrier;
connecting a differential cover to the differential carrier, the differential cover forcing the first side gear into the spider gears;
partially nesting a hollow drive shaft radially within the differential cover to direct oil from inside of the hollow drive shaft into the spider gears;
drivingly connecting a first output shaft to the first side gear and drivingly connecting a second output shaft to the second side gear, the spider gears rotatably mounted on the support pins and positioned between the first side gear and the second side gear, each of the spider gears intermeshing with both the first side gear and the second side gear to transmit power from the support pins to the first side gear and the second side gear for allowing the first output shaft and the second output shaft to rotate about a center axis at different speeds; and
installing a resilient spacer axially between the first side gear and the differential cover to force the first side gear into the spider gears and to define a radial gap axially between the first side gear and the differential cover, the first side gear and the differential cover being arranged to direct fluid flowing from inside of the hollow drive shaft into the spider gears.

14. The method as recited in claim 13 wherein the partially nesting is performed to provide a radially extending end surface of the hollow drive shaft axially facing toward the first side gear such that the radially extending end surface of the hollow drive shaft is axially closer to the first side gear than a radially extending end surface of the differential cover that axially faces away from the first side gear.

15. The method as recited in claim 14 wherein the first side gear includes a tubular hub including a radially extending end surface that axially faces away from the first side gear and directly axially toward the radially extending end surface of the hollow drive shaft, wherein the partially nesting is performed to provide an axial gap between the radially extending end surface of the tubular hub and the radially extending end surface of the hollow drive shaft, an inner circumferential surface of a guide portion of the differential cover being directly radially aligned with the axial gap.

16. The method as recited in claim 15 wherein the connecting of the differential cover to the differential carrier includes radially spacing the inner circumferential surface of the guide portion of the differential cover from an outer circumferential surface of the tubular hub of the first side gear to define an annular gap therebetween.

17. The method as recited in claim 16 wherein the hollow drive shaft, the guide portion of the differential cover and the tubular hub of the first side gear are arranged to direct fluid flowing axially within the hollow drive shaft toward the first side gear radially outward through the axial gap, and axially through the annular gap into the spider gears.

18. A drive assembly for a motor vehicle drivetrain comprising:
    a differential configured for driving a first output shaft and a second output shaft about a center axis and for allowing the first output shaft and the second output shaft to rotate about the center axis at different speeds, the differential comprising:
        a first side gear on a first side of the differential configured for being drivingly connected to the first output shaft;
        a second side gear on a second side of the differential configured for being drivingly connected to the second output shaft;
        a differential housing enclosing the first and second side gears;
        support pins non-rotatably fixed to the differential housing; and
        spider gears rotatably mounted on the support pins and positioned between the first side gear and the second side gear, each of the spider gears intermeshing with both the first side gear and the second side gear to transmit power from the support pins to the first side gear and the second side gear; and
    a hollow drive shaft for driving the differential, the differential housing configured for transmitting power from hollow drive shaft to the support pins,
    the hollow drive shaft being partially nested radially within the differential housing to direct oil from inside of the hollow drive shaft into the differential housing,
    the first side gear being axially spaced from the hollow drive shaft to define an axial gap axially between the first side gear and the hollow drive shaft, the first side gear being arranged to direct fluid flowing from inside of the hollow drive shaft radially outward through the axial gap into the differential housing.

\* \* \* \* \*